(No Model.) 2 Sheets—Sheet 2.

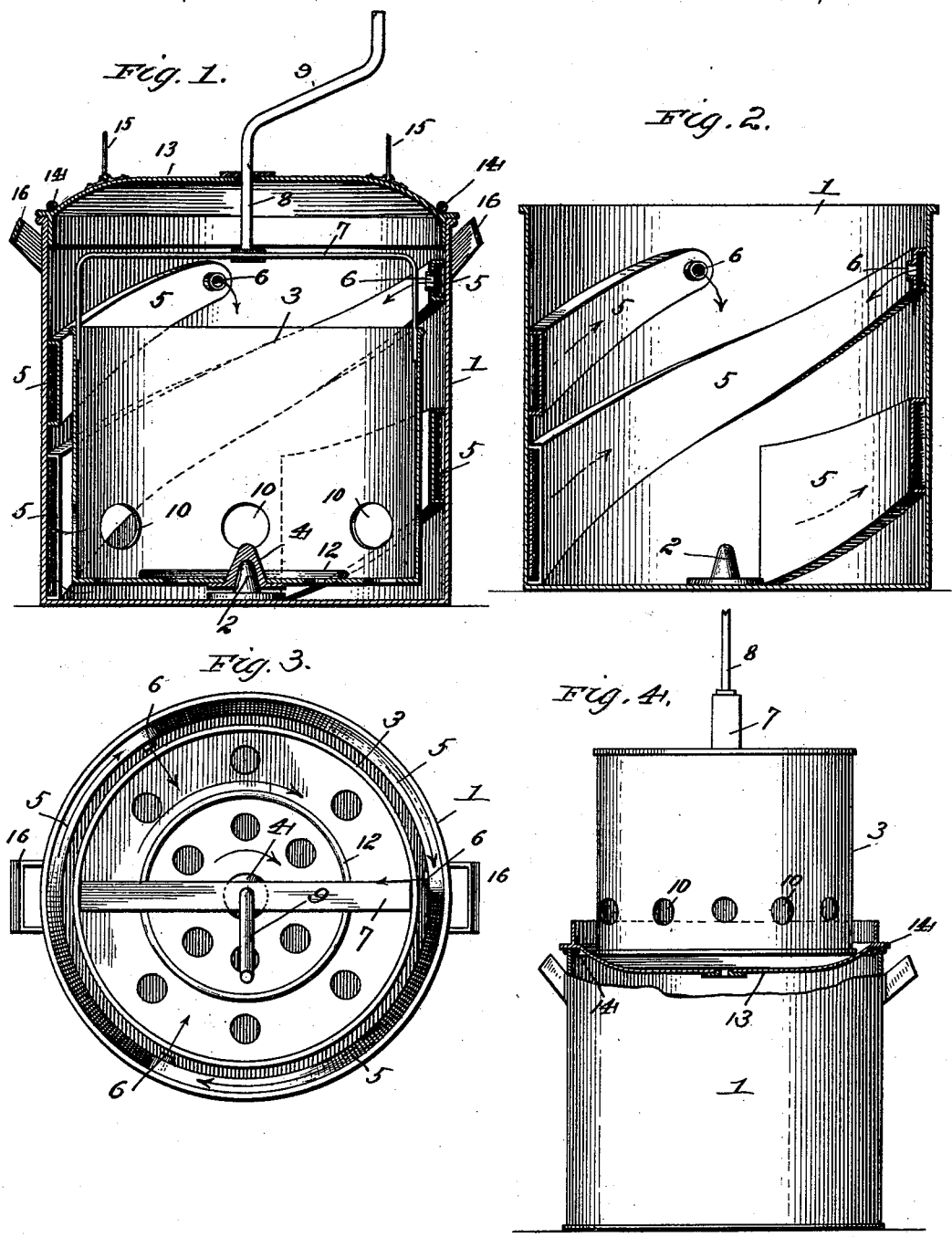

J. WYLIE.
DISH CLEANER.

No. 583,833. Patented June 1, 1897.

Witnesses Inventor
James Wylie
By Alexander & Davis
Attorneys

UNITED STATES PATENT OFFICE.

JAMES WYLIE, OF SALEM, VIRGINIA.

DISH-CLEANER.

SPECIFICATION forming part of Letters Patent No. 583,833, dated June 1, 1897.

Application filed September 21, 1896. Serial No. 606,578. (No model.)

*To all whom it may concern:*

Be it known that I, JAMES WYLIE, a citizen of the United States, residing at Salem, in the county of Roanoke and State of Virginia, have invented certain new and useful Improvements in Dish-Washing Machines, of which the following is a specification, reference being had therein to the accompanying drawings.

This invention relates to a new and improved dish-washing machine; and it has for its object to provide a simple and inexpensive device adapted for use in households, as well as in hotels and similar places.

The invention consists in the novel combination and arrangement of parts hereinafter described, and particularly pointed out in the claims appended.

Figure 5:
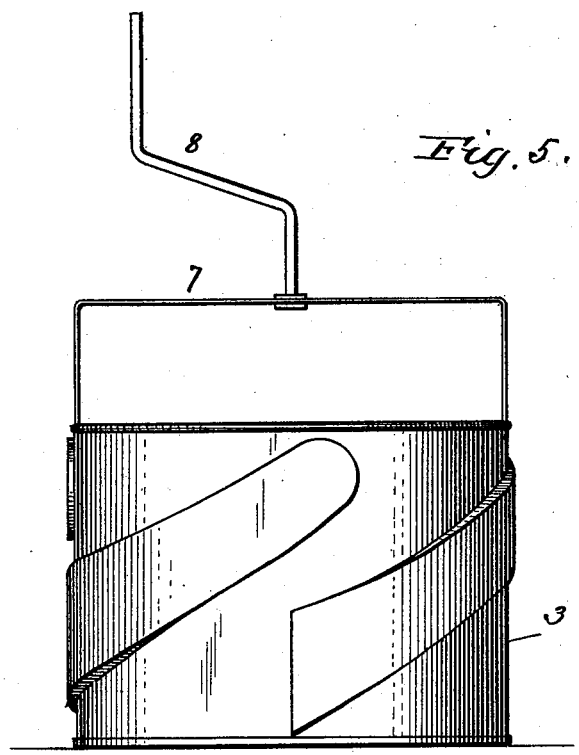
Figure 6:
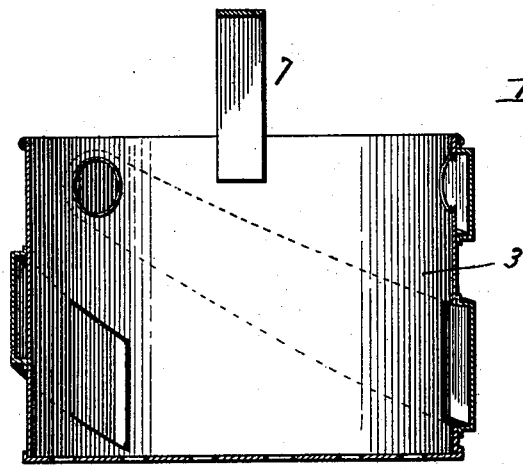

In the drawings, Figure 1 is a vertical sectional view of the machine complete. Fig. 2 is a similar view of the outer or water receptacle. Fig. 3 is a plan view, the cover being removed. Fig. 4 is a side elevation showing the position of the parts for draining the dishes. Fig. 5 is a side elevation of the dish-receptacle, showing the water-raising tubes secured thereto; and Fig. 6 is a vertical sectional view thereof.

Referring to the various parts by numerals, 1 designates the cylindrical outer or water receptacle, from the center of the bottom of which projects an upwardly-extending conical bearing 2. Mounted to turn upon this bearing is a cylindrical inner or dish receptacle 3, which is somewhat smaller in diameter than receptacle 1 and is provided at the center of its bottom with a conical socket 4, which receives the conical bearing 2. Around the inner side of the water-receptacle 1 are arranged a series of flat tapering tubes 5. The open lower ends of these tubes are at the bottom of the vessel and are vertical, as shown. The tubes taper from their lower to their upper ends and wind around the vessel from their lower to their upper ends in the direction of the revolution of the inner vessel, those shown in the drawings inclining upwardly and winding from the left to the right. The upper ends of the tubes extend above the upper edge of the inner vessel and are each formed with an outlet 6. In the drawings is shown only three tubes, each of which extends over one-half of the circumference of the outer vessel, but, as is manifest, as many tubes as desired may be employed, and they may be extended any suitable distance around the vessel.

To the top of the dish-receptacle is secured a bail 7, from the center of which a vertical bar 8 extends, said bar being formed into a crank 9 above the cover of the outer or water receptacle. The dish-receptacle is formed with holes 10 near its lower end adjacent the openings into the lower ends of the tubes 5. The bottom of this receptacle is perforated for the free passage of the water when the dishes are set to drain. A rib 12 is formed on the inner side of the bottom of the dish-receptacle by securing to it a circle of strong wire, against which the dishes rest, said rib preventing them from slipping during the revolution of said receptacle. The cone 4 also forms a stop against which the dishes rest and which aids in preventing said dishes from slipping.

The water-receptacle 1 is provided with a flanged cover 13, through the center of which the rod 8 extends, a metal boss reinforcing the opening through which said bar extends.

A rib 14 is formed on the top of the cover by securing thereto a circle of wire, said rib being adapted to fit tightly within the receptacle 1 and adapt the cover to be reversed, as shown in Fig. 4. The cover 13 is provided with suitable handles 15, and handles 16 are secured to receptacle 1 for convenience in moving same.

The operation of the machine is as follows: The dishes are placed in the inner vessel and the vessel is placed in the receptacle 1. Hot water and the cleaning materials, if any are used, are now poured over the dishes until the vessels are filled to the top of the openings into the tubes 5. The cover 13 is now placed in position and the inner vessel is revolved. The revolution of the inner vessel drives the water by centrifugal force out through the openings 10 in the inner vessel and up into the tubes 5. By the rapid revolution of the dish-receptacle the water is driven into the tubes 5 with sufficient force to cause it to flow out through the openings 6 in their upper ends and down into the dish-receptacle onto the dishes. This operation is continued until the dishes are thoroughly cleaned. The dish-receptacle is then removed and cover 13 is reversed, as shown in Fig. 4. The dish-receptacle is now placed upon the cover, the water draining from the dishes passing into the water vessel through the central opening in the cover. In this position clean hot water may be poured upon the dishes to rinse them, as is manifest.

It will thus be seen that this is a very simple, inexpensive, and thoroughly efficient dish-washing machine, and that it is adapted for the household as well as for hotel use.

In Figs. 1, 2, and 3 of the drawings the tubes 5 are shown secured to the water-receptacle, but these tubes may be with equal facility secured to the dish-receptacle, as shown in Figs. 5 and 6; but it is preferred to secure them as shown in Fig. 1, as that arrangement seems more practicable.

It will be noted that the outlet from each tube is above the level of the water contained in the vessels and that the water will be raised above the dishes contained in the dish-receptacle and then poured upon them. This will aid greatly in cleaning the dishes, besides causing a positive circulation of the water in the vessels, as the water is taken from the bottom of the dish-receptacle and then poured into it again over its upper edge. It will also be carried partly around the receptacle and be poured into it at a point opposite that from which it left the receptacle. It will thus be readily seen that a rapid and positive circulation of the water will be maintained during the entire operation of the machine.

Having thus fully described my invention, what I claim, and desire to secure by Letters Patent, is—

1. In a dish-washing machine the combination of a water-receptacle, a dish-receptacle adapted to be rotated within the water-receptacle, and a spiral tube carried by one of said vessels, said tube extending upward and around the vessel and being open at its lower end and formed with an outlet at its upper end, the walls of said tube being solid between said openings, whereby water will enter said tube at the bottom of the vessel only and will be carried toward the top thereof and delivered again into the vessel whereby a positive circulation of the water will be caused, substantially as and for the purpose described.

2. In a dish-washing machine the combination of an outer receptacle, an inner or dish receptacle adapted to be revolved within the outer receptacle, said dish-receptacle being provided with openings only near the lower edge thereof the walls of said receptacle being solid from said opening to its upper edge, and a spiral tube secured to one of said receptacles, its lower end being open adjacent the openings in the dish-receptacle, its upper end being provided above the dish-receptacle, with an outlet, whereby the water will pass out of the dish-receptacle near the bottom thereof and will be poured into it at its upper edge, substantially as described.

3. In a dish-washing machine the combination of an outer receptacle, an inner receptacle adapted to revolve within the outer receptacle and formed with solid vertical walls perforated at their lower ends, a series of spiral tapered tubes secured to the outer receptacle, said tubes being open at their lower ends and formed with openings at their upper ends above the upper edge of the dish-receptacle, the walls of said tubes being solid between said openings, whereby the water will pass out of said receptacle at its lower end and into the tubes and then up the tubes and again into the receptacle over its upper edge, substantially as described.

In testimony whereof I affix my signature in presence of two witnesses.

JAMES WYLIE.

Witnesses:
 H. E. MOOMAW,
 C. C. TAYLOR.